S. Y. SULLIVAN.
BRACKET FOR KITCHEN TABLES.
APPLICATION FILED MAR. 5, 1921.
1,402,910.
Patented Jan. 10, 1922.
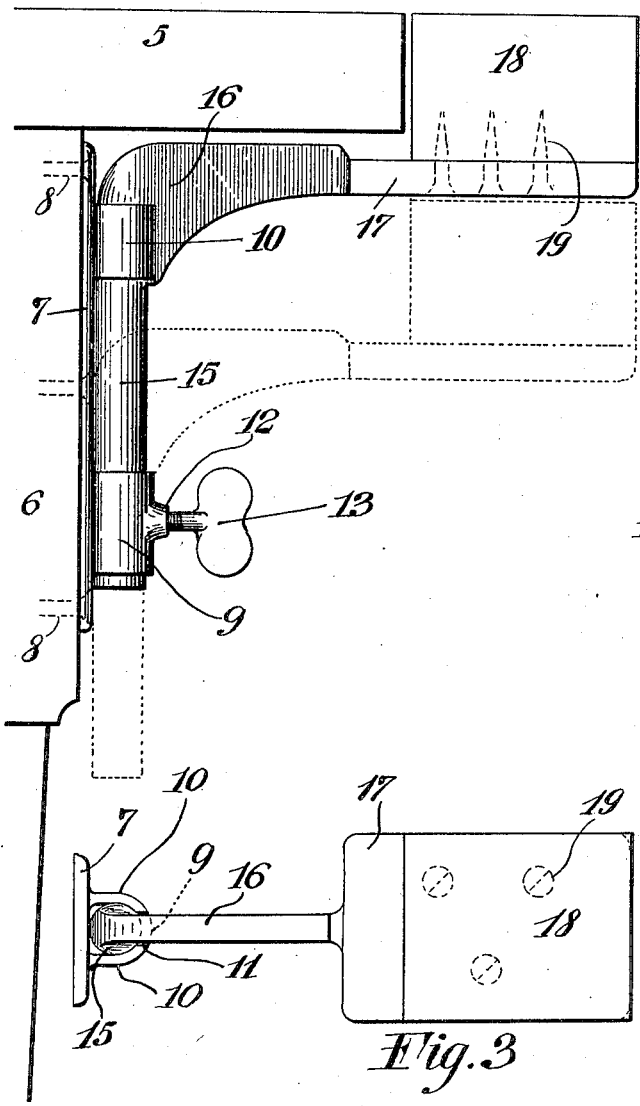
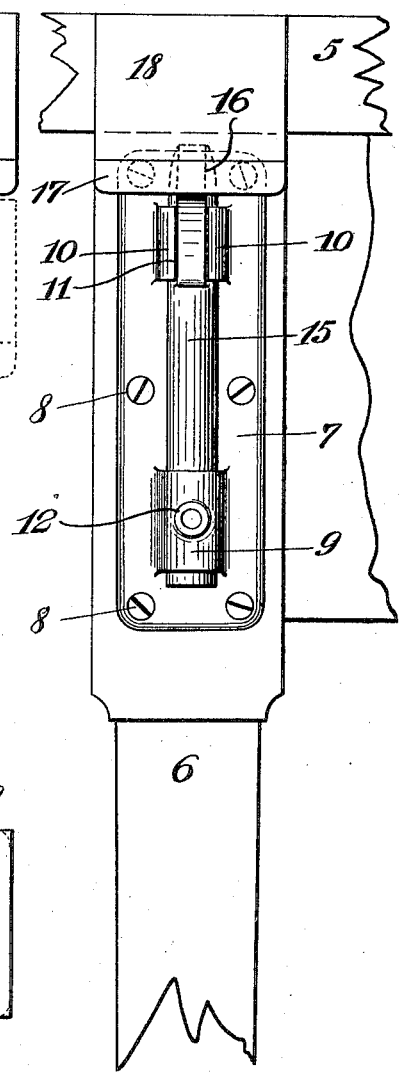
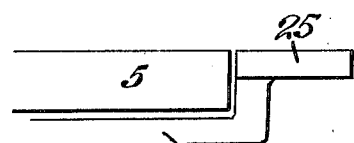
Inventor
Sidney Y. Sullivan
By his Attorney
Ivan E. C. Konigsberg

UNITED STATES PATENT OFFICE.

SIDNEY Y. SULLIVAN, OF NEWARK, NEW JERSEY.

BRACKET FOR KITCHEN TABLES.

1,402,910. Specification of Letters Patent. Patented Jan. 10, 1922.

Application filed March 5, 1921. Serial No. 450,022.

*To all whom it may concern:*

Be it known that I, SIDNEY Y. SULLIVAN, a citizen of the United States, and resident of Newark, in the county of Essex and State of New Jersey, have invented certain new and useful Improvements in Brackets for Kitchen Tables, of which the following is a specification.

This invention relates to a bracket for kitchen tables or furniture. Particularly this invention relates to a bracket or similar device adapted to be attached to a kitchen table or cabinet in such a manner that the bracket may serve as a means for securing a meat chopper, cake or bread mixer or other similar device.

It is well known that kitchen table tops of marble or other stone, and of enameled ware are being brought into frequent use due to the handsome appearance of such table tops and because of their sanitary features.

Devices, such as meat choppers or cake mixers, cannot for obvious reasons be attached to tops of enameled ware or stone, because such devices have to be attached very securely by means of a vise with which they are usually provided, and the pressure of the vise on the kitchen table top breaks the stone and the enamel and spoils the top.

This invention, therefore, aims to provide a bracket to which a meat chopper or the like may be attached and which bracket in turn may be secured to a kitchen table so as to be brought into use when needed and to be manipulated out of sight and out of the way when not required.

Accordingly my invention is embodied in a bracket as hereinafter described and as illustrated in the accompanying drawing in which—

Fig. 1 is a side view of a bracket embodying my invention showing it attached to a table.

Fig. 2 is a view of the bracket at right angle to Figure 1.

Fig. 3 is a plan view of the bracket.

Fig. 4 shows a modification.

Referring to the drawing the reference numeral 5 denotes the table top and 6 the table leg. The top may be of marble, stone, enameled ware or wood. The bracket comprises a supporting plate 7 adapted to be secured to the leg 6 by means of screws as 8. The plate is provided with a lower supporting loop 9 and upper guide lugs 10, 10 which partly form a loop as seen in Figure 3. A slot 11 is provided between the guide lugs 10. The loop 8 is provided with a boss 12 into which is screwed a wing bolt 13.

The bracket portion proper consists of a stem 15 adapted to slide in and swing in the lower loop 9. The upper part of the stem is formed into a flat vertically disposed guide 16 adapted to move in the slot 11 between the guide lugs 10. The guide portion 16 extends forwardly and merges into a shelf like foot 17 which carries a wooden block or pad 18 secured by screws 19. The foot 16 is long enough to provide for suitable adjustment of the block 18 according to the overhang of the top 5. For instance in kitchen cabinets such overhang is usually less than in tables.

The use of the bracket is as follows: First it is placed in position as shown with the block 18 flush with the top 5 and with the guide 16 in position between the lugs 10. The plate 7 is then moved up into proper position and secured with the screws 8, the bracket being held to the plate by wing bolt 13.

In this position it is ready for use and a meat chopper or other device may be clamped to the pad 18 to extend in over the table. In this position the pad cannot move laterally because of the guide 16 between the lugs 10 and it cannot be depressed because of the wing bolt 13 as will be understood.

When the bracket is no longer to be used as described, the wing bolt 13 is loosened and the bracket stem and associated parts will fall down by gravity until it comes to rest as seen in Figure 1 in which the bracket is shown in its lower position in dotted lines, when of course it may be swung to one side against the side of the table and under the overhang of the table top. The bracket and pad or block 18 is thus moved out of sight.

When it is again to be used, the bracket is swung into position as shown and raised until the block 18 is again flush with the table top. It is then secured by the bolt 13 and is ready for use.

Fig. 4 illustrates a modification in which the pad 25 for the support of the meat chopper or similar device is integral with the bracket which in this figure is marked 26.

The bracket as herein disclosed is easily and cheaply manufactured and accomplishes the purpose. Details may of course be changed within the scope of the appended claim.

I claim:—

The combination with a table having a top overhanging the side thereof, of a supporting plate adapted to be secured to said table beneath the said overhanging top, said plate being provided with a pair of lugs in its upper portion and a loop in its lower portion, a bracket comprising a vertical stem adapted to be mounted within said lugs and loop and a horizontal portion extending at right angle to said stem, said stem and horizontal portion being joined by a vertically flat corner portion adapted to be positioned between the said lugs to keep said bracket laterally immovable, a block secured to said horizontal bracket portion, means for adjusting said bracket vertically to bring the said block flush with the table top and to position said corner portion within the said lugs as aforesaid, said bracket and block being adapted to be lowered below the said lugs and to be moved in under the said overhang of the table.

SIDNEY Y. SULLIVAN.